United States Patent
Dennert

(10) Patent No.: US 6,808,061 B2
(45) Date of Patent: Oct. 26, 2004

(54) PROCESS AND APPARATUS FOR DEPOSITING PRODUCTS IN A DEFINED MANNER FROM A COMPARTMENT-CONTAINING CHAIN

(75) Inventor: Martin Dennert, Brey (DE)

(73) Assignee: Winkler + Duennebier AG, Neuwied (DE)

( * ) Notice: Subject to any disclaimer, the term of this patent is extended or adjusted under 35 U.S.C. 154(b) by 0 days.

(21) Appl. No.: 10/262,304

(22) Filed: Sep. 30, 2002

(65) Prior Publication Data

US 2003/0079961 A1 May 1, 2003

(30) Foreign Application Priority Data

Oct. 16, 2001 (DE) .......................................... 101 50 496

(51) Int. Cl.$^7$ ............................................. B65G 25/00
(52) U.S. Cl. ..................................................... 198/430
(58) Field of Search ................................ 198/426, 429, 198/430, 432, 433, 443, 736, 741

(56) References Cited

U.S. PATENT DOCUMENTS

| | | | | |
|---|---|---|---|---|
| 4,399,905 A | * | 8/1983 | Lance et al. ................ | 198/430 |
| 4,480,741 A | * | 11/1984 | Chicurel et al. ............ | 198/430 |
| 4,927,322 A | * | 5/1990 | Schweizer et al. ........ | 414/794.7 |
| 5,176,244 A | * | 1/1993 | Radzins et al. ............. | 198/430 |
| 5,261,522 A | * | 11/1993 | Guttinger et al. ........... | 198/429 |
| 5,339,944 A | * | 8/1994 | Ostholt et al. .............. | 198/430 |
| 5,460,258 A | * | 10/1995 | Tisma ........................ | 198/430 |
| 5,547,064 A | * | 8/1996 | Meyer et al. ............. | 198/468.1 |
| 5,768,856 A | * | 6/1998 | Odenthal ..................... | 53/443 |
| 6,408,601 B1 | * | 6/2002 | Odenthal et al. ............. | 53/493 |

* cited by examiner

Primary Examiner—Khoi H. Tran
(74) Attorney, Agent, or Firm—W. F. Fasse; W. G. Fasse

(57) ABSTRACT

Products are to be discharged at a discharge station from a compartmentalized conveyor (3) having laterally open compartments (7) formed between parallel intermediate walls (5) for accommodating the laterally projecting products (1). To push plural products out of the conveyor compartments, a pushing device (12) is moved out of a starting position in a running direction parallel to the conveying direction of the conveyor (3), and simultaneously is moved in a pushing direction perpendicular to the conveying direction by means of a crank drive via a connecting rod, and then is moved back into the starting position.

14 Claims, 2 Drawing Sheets

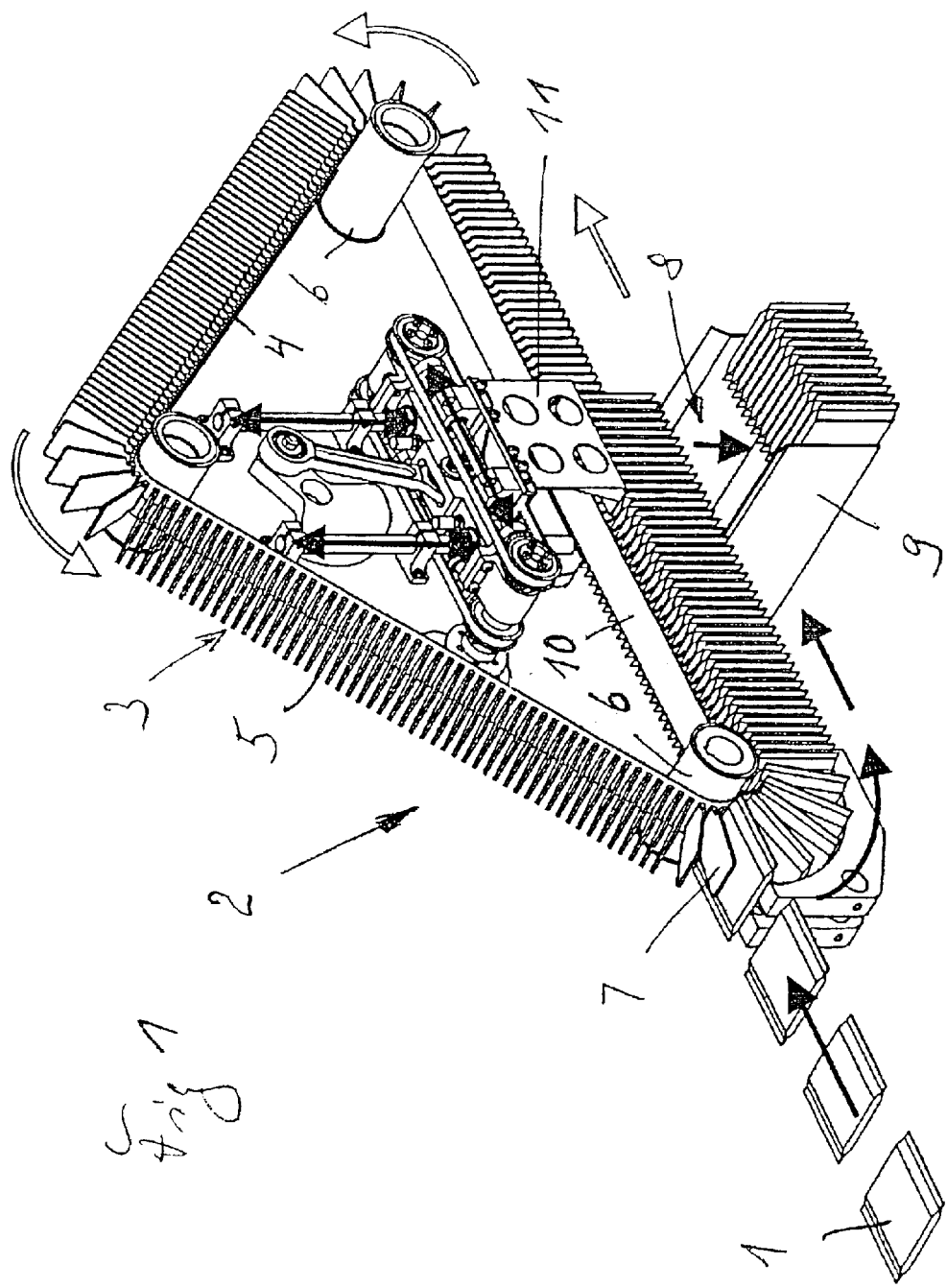

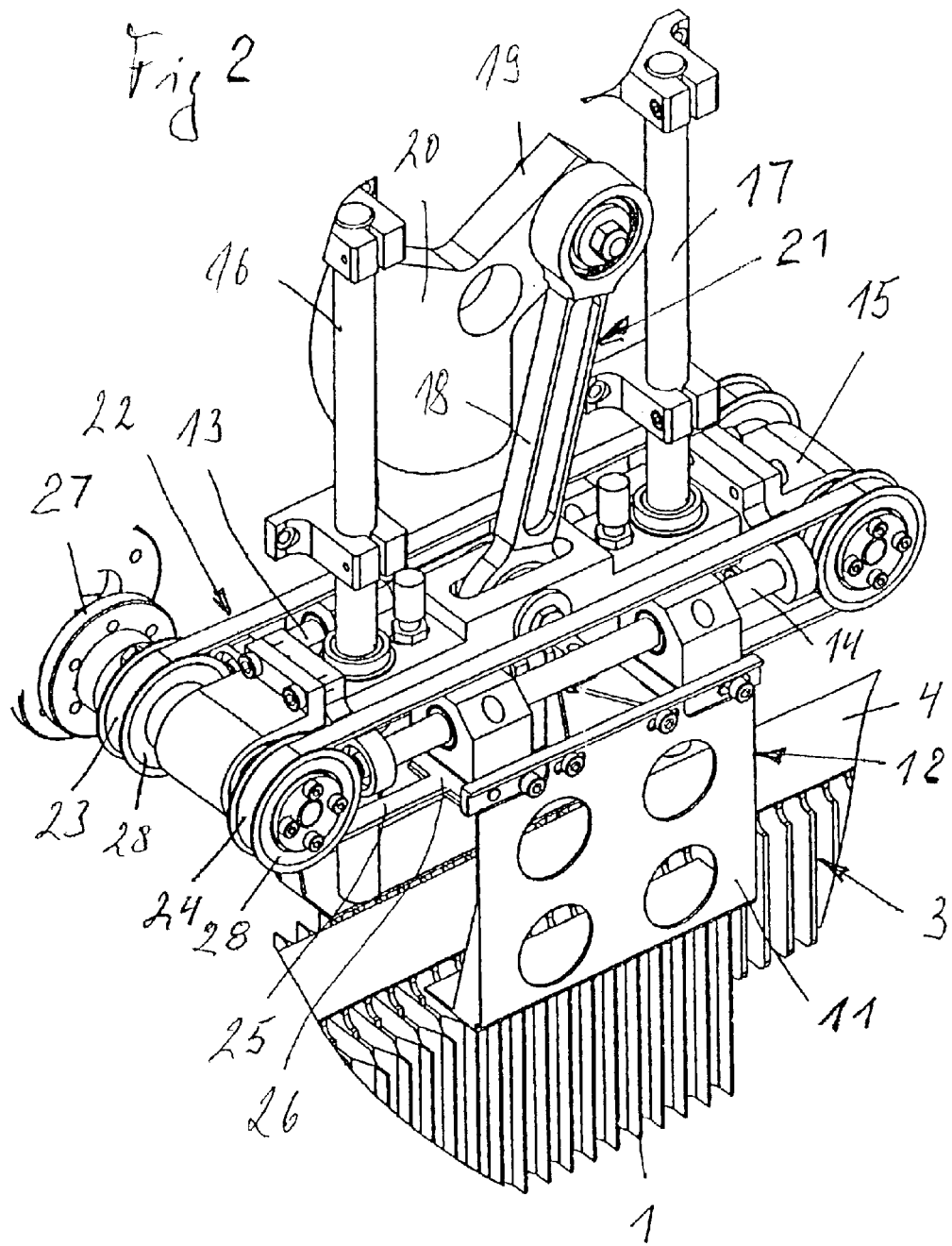

PROCESS AND APPARATUS FOR DEPOSITING PRODUCTS IN A DEFINED MANNER FROM A COMPARTMENT-CONTAINING CHAIN

FIELD OF THE INVENTION

The invention relates to a process and an apparatus for depositing products in a defined manner, from a compartment-containing chain, onto a conveying section.

BACKGROUND INFORMATION

Using a compartment-containing chain for depositing products, for example hygiene products, is known from WO 99/18019. The compartment-containing chain comprises a transporting belt, which circulates endlessly around deflecting rollers, and has compartments which are formed by parallel intermediate walls and serve for accommodating, for example, laterally projecting products. An ejecting element is provided for depositing the products and can be moved transversely to the movement direction of the filled compartment-containing chain, the laterally projecting borders of the products being intercepted and pushed out of the compartment-containing chain. In this case, they slide, for example, onto a receiving means or into a shaft and are then transported further in order, finally, to be packaged.

SUMMARY OF THE INVENTION

The object of the invention is to provide measures in order for it to be possible not just for such a compartment-containing chain to be filled very quickly with individual products at one of its deflecting locations, but also to be emptied again in the depositing region, a plurality of products in each case being combined there, at the same time, to form a stack. This depositing operation, furthermore, takes place within narrow, spatial limits and, for this reason, has to take place extremely quickly.

In order to achieve the object, the invention provides that a pushing device, which intercepts a plurality of products, is moved out of a starting position parallel to the compartment-containing chain and, at the same time, in the pushing-out direction and then back into the starting position again by means of a crank drive via a connecting rod.

The ejecting element or elements provided according to the invention move not just in the ejecting direction, but also transversely thereto, during the ejecting operation. Movements in the direction of the conveying chain and in the ejecting direction are thus superposed. This makes it possible for the ejecting element or elements to intercept a precisely defined number of products and to push them securely and reliably onto a receiving means or into a shaft.

Further features of the invention can be gathered from subclaims and from the description in conjunction with the drawing.

BRIEF DESCRIPTION OF THE DRAWINGS

The invention is described in more detail hereinbelow with reference to an exemplary embodiment which is illustrated in the drawing, in which:

FIG. 1 shows a perspective view of the compartment-containing chain and of the apparatus for ejecting the products into a shaft, and FIG. 2 shows, on a larger scale, a cut-away perspective view of the ejecting apparatus.

DETAILED DESCRIPTION OF PREFERRED EXAMPLE EMBODIMENTS, AND OF THE BEST MODE OF THE INVENTION

An apparatus for producing products, in particular hygiene products 1, this apparatus not being illustrated in the figures, comprises a station 2 which serves for packaging purposes and, inter alia, has a compartment-containing chain 3. The compartment-containing chain comprises a belt 4 with compartment-forming intermediate walls 5. The compartment-containing chain 3 runs around deflecting rollers 6, in which case the intermediate walls 5 open in a wedge-shaped manner. At one of the deflecting rollers 6, in each case one product is pushed into the opening compartment 7 and then pivoted in the transporting direction of the compartment-containing chain 3. The products 1 are transported in a hanging position, and in a state in which they are clamped in between the intermediate walls 5, into a depositing region 8, which, according to the exemplary embodiment, is defined by a shaft 9. The shaft 9 has its longitudinal axis extending transversely to the transporting direction of the part 10 of the compartment-containing chain 3, said part 10 being filled with products 1.

In the laterally open compartments 7, the products 1 project likewise laterally beyond the compartments, as is illustrated in FIGS. 1 and 2. This makes it possible for the products 1 to be pressed downward out of the compartments 7 with the aid of ejecting elements 11.

Each ejecting element is of such a width that a plurality of products, not just a single product, can be pushed out of compartments 7 at the same time.

The shaft 9, which extends transversely to the movement direction of the part 10 of the compartment-containing chain 3, is located beneath the compartment-containing chain 3, with the result that the products slide out of the compartment-containing chain 3 into the shaft 9 on account of the gravitational force.

The apparatus for pushing the products 1 out of the compartment-containing chain 3 comprises a pushing device 12 with the ejecting elements 11 arranged on both sides of the belt 4. During the pushing-out or ejecting operation, the cross-sectionally I-shaped ejecting elements 11 press onto those borders of the products 1 which project laterally out of the compartments 7.

The pushing device 12 intercepts a plurality of products 1 and can be moved out of a starting position parallel to the conveying chain 3 and, at the same time, in the pushing-out direction and then back into the starting position again (FIG. 2).

The ejecting elements 11 can be moved along two guide rods 13 and 14 parallel to the conveying chain 3 or the part 10 of the latter which bears the products 1. The guide rods 13 and 14, for their part, are arranged on a carrier 15 which, for its part, can be moved in the ejecting direction along two guide rods 16 and 17. This makes it possible for the pushing device 12, which intercepts a plurality of products 1, to be moved out of its starting position parallel to the conveying chain 3 and, at the same time, in the pushing-out direction and then back into the starting position again.

The stroke movements, i.e. lifting and lowering movements of the carrier 15 along the guide rods 16 and 17 are achieved with the aid of a connecting rod 18, which is articulated, on the one hand, on the carrier 15 and, on the other hand, on an arm 19 of a crank drive 21. The arm 19 has a compensating and balance weight 20 on an end or side thereof opposite the connection of the arm 19 to the connecting rod 18. Together, these parts form the crank drive or connecting-rod drive 21.

The movements of the pushing device 12 which take place parallel to the compartment-conveying chain 3 are achieved with the aid of a belt drive 22. This comprises two drive belts 23 and 24 which run around deflecting rollers 28 on the carrier 15 and allow the pushing device 12 to move back and forth. In each case one strand 25 of the two drive belts 23 and 24 is guided on the two guide rods 13 and 14 and connected to the ejecting elements 11 with the aid of carry-along elements 26.

A motor drive, which is not illustrated in the figures, is provided on the machine both for the carrier 15 and for the other moving parts.

A universal force-transmission means, for example, in the form of a cardan shaft or, in accordance with the illustration in the figures, in the form of a Schmidt coupling 27 makes it possible for the drive belts 23 and 24, which run around deflecting rollers 28 on the carrier 15, to execute brief movements back and forth in each case.

What is claimed is:

1. A conveying apparatus for conveying products comprising:

plural deflection rollers;

an endless compartmentalized conveyor comprising divider walls that are spaced apart from one another successively along said conveyor so as to form respective compartments adapted to receive the products therein between successive ones of said divider walls, wherein said compartmentalized conveyor is deflected endlessly around said deflection rollers, and is adapted to be driven so that a loaded portion of said compartmentalized conveyor having the products disposed in said compartments is moved in a conveying direction to a discharge station of said conveying apparatus;

a product ejection apparatus that is arranged adjacent to said compartmentalized conveyor at said discharge station and comprises a pushing arrangement that is movable with a reciprocating running motion in a running direction parallel to said conveying direction and movable with a reciprocating pushing motion in a pushing direction perpendicular to said conveying direction, and wherein said pushing arrangement includes at least one ejecting element configured and arranged so as to simultaneously contact and eject a plurality of the products out of the loaded portion of the compartmentalized conveyor at the discharge station while undergoing said pushing motion and said running motion;

a crank drive including a rotationally drivable crank; and a connecting rod having a first end pivotally connected to said crank and a second end pivotally connected to said product ejection apparatus, whereby said connecting rod is adapted to convert a rotational motion of said crank to said reciprocating pushing motion of said pushing arrangement in said pushing direction.

2. The conveying apparatus according to claim 1, wherein:

said crank comprises a crank arm that is rotationally drivable about an axis and that has said first end of said connecting rod connected to a radially outer end thereof;

said product ejection apparatus comprises a carriage that has said second end of said connecting rod pivotally connected thereto and that is movable with said reciprocating pushing motion in said pushing direction; and said pushing arrangement is carried by said carriage with said reciprocating pushing motion in said pushing direction, and is movably connected to said carriage so as to be movable with said reciprocating running motion in said running direction relative to said carriage.

3. The conveying apparatus according to claim 2, wherein:

said product ejection apparatus further comprises stationary first guide rods extending perpendicular to said conveying direction, and second guide rods extending parallel to said conveying direction and perpendicular to said first guide rods;

said second guide rods are connected to and carried by said carriage;

said carriage is movably arranged on said first guide rods to be slidable therealong with said reciprocating pushing motion in said pushing direction; and said pushing arrangement is movably arranged on said second guide rods to be slidable therealong with said reciprocating running motion in said running direction, whereby said pushing arrangement is carried by and movably connected to said carriage.

4. The conveying apparatus according to claim 3, wherein:

said product ejection apparatus further comprises a belt drive adapted to impose said reciprocating running motion on said pushing arrangement; and said belt drive comprises at least a pair of deflection pulleys that are each rotatably mounted on and carried by said carriage, and at least one drive belt that extends endlessly around said pair of deflection pulleys and is connected to said pushing arrangement.

5. The conveying apparatus according to claim 4, wherein said pushing arrangement further comprises at least one driver member that is engaged with one strand of said drive belt, and is slidingly mounted on at least one of said second guide rods, and is connected with said at least one ejecting element.

6. The conveying apparatus according to claim 4, wherein said belt drive further comprises an articulated shaft with a Schmidt coupling connected to at least one of said deflection pulleys and adapted to impart an intermittent reversing rotation thereto.

7. The conveying apparatus according to claim 2, wherein:

said product ejection apparatus further comprises a belt drive adapted to impose said reciprocating running motion on said pushing arrangement; and said belt drive comprises first and second pairs of deflection pulleys that are each rotatably mounted on and carried by said carriage, and parallel first and second drive belts that respectively extend endlessly around said first and second pairs of deflection pulleys and are respectively connected to said pushing arrangement.

8. The conveying apparatus according to claim 2, wherein said crank further comprises a counterweight arranged opposite said crank arm about said axis.

9. The conveying apparatus according to claim 1, wherein said product ejection apparatus, said crank drive and said connecting rod are located within a space bounded outwardly by said compartmentalized conveyor running endlessly around said deflection rollers.

10. The conveying apparatus according to claim 1, wherein said loaded portion is a portion of a lowermost strand of said compartmentalized conveyor between two of said deflection rollers, said compartments are open downwardly away from said loaded portion of said compartmentalized conveyor, and said pushing direction is a downward vertical direction.

11. The conveying, apparatus according to claim 1, wherein said compartments are open laterally along a side edge of each said divider wall and outwardly along a distal free edge of each said divider wall, the products protrude laterally out of said compartments beyond said side edges of said divider walls, and said ejecting element is movably arranged to move laterally adjacent to side edges of said divider walls to contact and push the products outwardly out of said compartments past said distal free edges of said compartments.

12. A method of conveying products comprising the steps:
   a) loading products successively into compartments of a compartmentalized conveyor;
   b) conveying said products in said compartments by driving said compartmentalized conveyor;
   c) providing a rotational drive input;
   d) converting said rotational drive input to a reciprocating pushing motion via a crank and a connecting rod;
   e) at a discharge station, applying said reciprocating pushing motion from said connecting rod to a pushing arrangement in a direction perpendicular to said conveyor in said discharge station, and simultaneously applying a reciprocating running motion to said pushing arrangement in a direction parallel to said conveyor in said discharge station; and
   f) discharging said products from said conveyor by contacting said products with said pushing arrangement and pushing said products out of said compartments in said discharge station.

13. The method of conveying products according to claim 12, wherein said step b) comprises running said conveyor around plural deflection rollers, said step a) comprises carrying out said loading at a loading station at one of said deflection rollers, said conveying in said step b) further comprises moving said products in said compartments downwardly from said loading station and then along a lowermost conveyor strand of said compartmentalized conveyor to said discharge station, and said discharging of said products comprises said pushing in a vertical downward direction.

14. The method of conveying products according to claim 12, further comprising generating said reciprocating running motion using a belt drive arrangement.

* * * * *